May 9, 1950     A. GRUEN ET AL     2,507,155
TAIL STOCK FOR LATHES
Filed Jan. 8, 1947     2 Sheets-Sheet 1
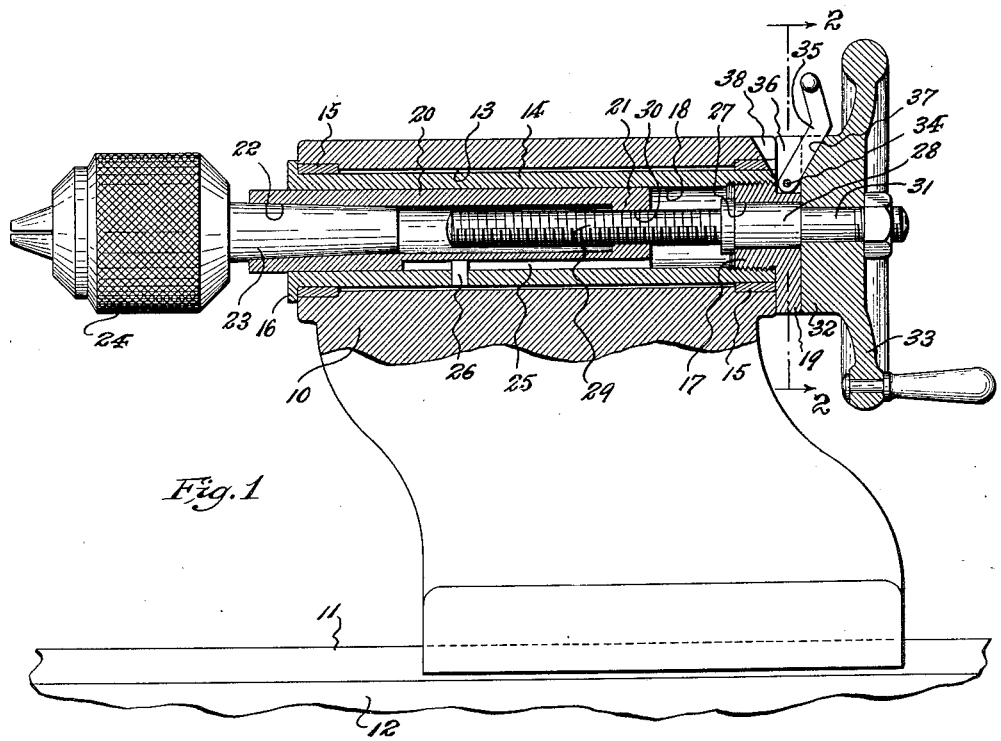
Fig. 1
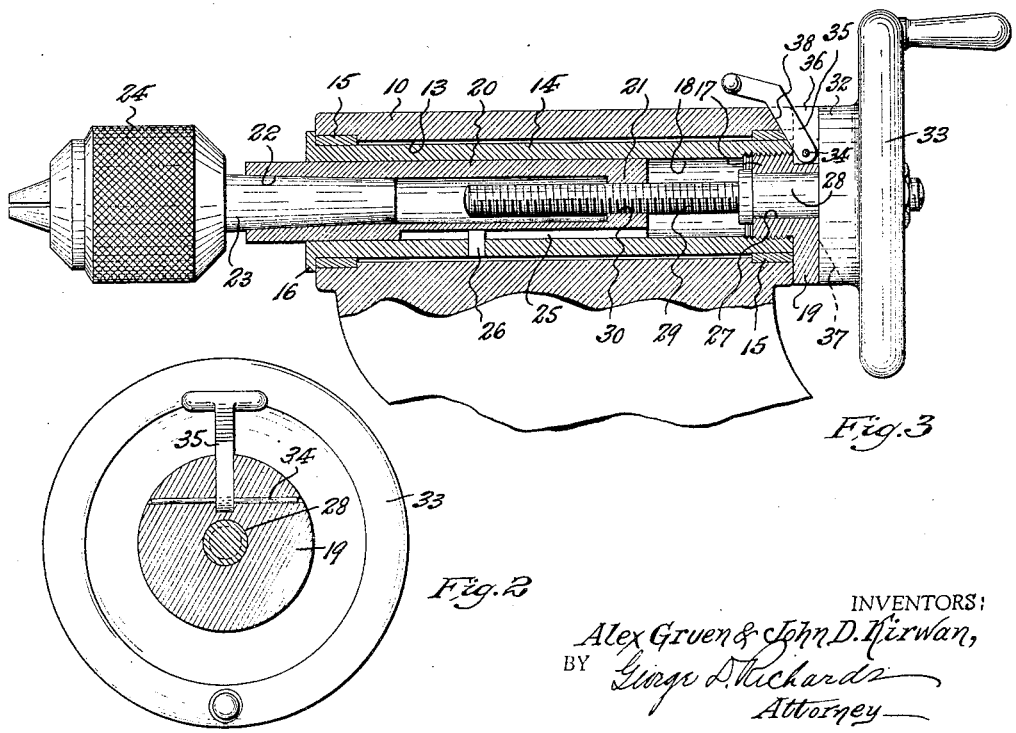
Fig. 2
Fig. 3
INVENTORS:
Alex Gruen & John D. Kirwan,
BY George D. Richards
Attorney Patented May 9, 1950

2,507,155

UNITED STATES PATENT OFFICE 2,507,155

TAILSTOCK FOR LATHES

Alex Gruen, West Orange, and John D. Kirwan, Bloomfield, N. J.

Application January 8, 1947, Serial No. 720,808

5 Claims. (Cl. 10—105)

This invention relates to improvements in lathes; and the invention has reference, more particularly, to an improved construction of tailstock for lathes, whereby the lathe mechanism may be more conveniently and efficiently used for carrying out tapping, threading, reaming, drilling and similar operations.

The conventional lathe tailstock comprises a housing which is movable on the ways of the lathe bed toward and from the lathe headstock. Said housing is provided with a spindle having, at its forward end, a tapered socket or bore to receive and hold fast one of various types of center points or a chuck for operatively mounting a tap, reamer, drill or other tool. Said spindle is keyed to the housing so as to be non-rotatable but nevertheless axially movable or slidable in the housing, and journaled in said housing is a handwheel manipulatable screw-threaded shaft which is arranged in threaded engagement with the rear end of the spindle, whereby rotation of said shaft in selected direction is operative to project or retract the spindle relative to the housing as desired.

In such conventional type of lathe tailstock, as above briefly characterized, since the spindle and tool carried thereby cannot be rotated when using a carried tool for a tapping or threading operation, it is necessary to rotate the lathe headstock by which the work to be operated upon is supported and opposed to the tool. This is a definite disadvantage when attempting to perform a tapping or threading operation by means of a tool fixed in the tailstock supported chuck, since it is very difficult and usually impractical to turn the headstock by hand in order to impart required slow motion to the work, neither is it satisfactory to power drive the headstock, even at lowest speed, especially when cutting or tapping fine pitch threads or blind holes, for in neither case can the "feel," by which the operator gauges or judges the proper performance and progress of the operation, be experienced. Furthermore, under such circumstances, the tool being non-rotatable, in order to disengage the work from the tool, the direction of rotation of the headstock must be reversed, and often several times during the actual tapping or threading operation as well, all of which requires laborious and time time consuming changing of the speed gearing and other adjustnig operations necessary to effect required reverse rotation of the headstock.

Having these disadvantages of the conventional lathe tailstock in view, and with the purpose of avoiding the same, this invention has for an object to provide a novel construction of lathe tailstock, while being capable of conventional use and operation in carrying out ordinary operations for which a lathe is employed, is so constructed that the spindle and the tool carried thereby may be selectively conditioned so as to be subject merely to axial movement relative to the housing or to rotary movement relative thereto, at the option of the user.

The invention has for another object to provide in a lathe tailstock a novel spindle structure and novel manipulatable means cooperative therewith, said latter means being adapted, in one position thereof, to lock the spindle structure to the housing against rotation, and, in another position thereof, to release the spindle from the housing subject to rotary movement therein and thereupon engage the same with means for imparting rotary motion thereto.

Other objects of this invention, not at this time more particularly enumerated, will be understood from the following detailed description of the same.

Illustrative embodiments of this invention are shown in the accompanying drawings, in which:

Fig. 1 is a longitudinal sectional view of one form of tailstock according to this invention with the spindle structure conditioned subject to rotary movement; and Fig. 3 is a similar view with the spindle structure locked to the housing against rotary movement. Fig. 2 is a detail cross-sectional view, taken on line 2—2 in Fig. 1.

Similar characters of reference are employed in the above described views, to indicate corresponding parts.

Figure 4:
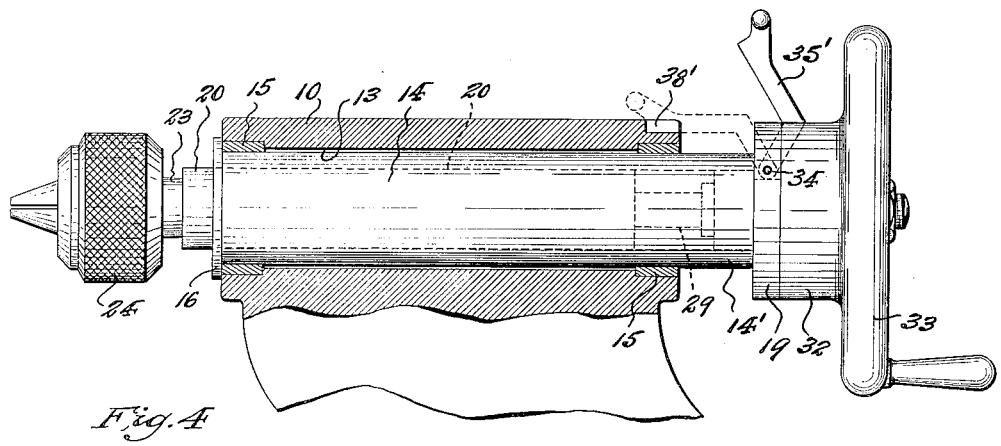
Fig. 4 is a longitudinal sectional view, with parts in elevation, of a modified form of tailstock according to this invention.

Referring first to Figs. 1 and 2 of the drawings, the form of lathe tailstock according to this invention therein illustrated comprises a tailstock body or housing 10, the base of which is slidably supported upon the cheeks or ways 11 of the lathe bed 12. The upper portion of said housing 10 is provided with a longitudinal endwise open bore 13 in which is mounted the spindle structure of the tailstock.

The spindle structure of the tailstock comprises a tubular spindle sleeve 14 which extends through the bore 13 of the housing 10, and which is supported therein by suitable bearing members 15 so as to be capable, under proper conditions, of rotary movement within the housing 10. The forward end of the spindle sleeve 14 projects exteriorly from the housing bore 13, and is provided with an external annular flange 16 which abuts the adjacent end of the housing, whereby to stop the spindle sleeve against rearward movement relative to said housing. Suitably affixed to the rearward end of said spindle sleeve 14, as e. g. by a hub or boss 17 which is threaded into the bore 18 thereof, is an annular end plate or cap 19. Slidably mounted in the forward end portion of the spindle sleeve bore 18, so as to project exteriorly therefrom, is a hollow spindle member 20 having a transverse wall 21 at its rear end. The forward end of said spindle member 20 is provided with an outwardly open internal tapered socket portion 22, which is adapted to receive a correspondingly tapered tail piece 23 of a chuck 24 by which a suitable tool (not shown) may be mounted on and held fast to said spindle member. Said spindle member 20 is provided with an external longitudinally extending keyway 25 which is adapted to be engaged by a key 26 that is affixed to the spindle sleeve 14, thus connecting the spindle member 20 to the spindle sleeve so as to prevent relative rotary motion of the former while, nevertheless, permitting longitudinal or axial movement thereof relative to said spindle sleeve.

The end plate or cap 19 and its hub or boss 17 is provided with an axially disposed bearing opening 27, in which is rotatably supported the journal portion 28 of a spindle member feed screw 29. The feed screw 29 is threaded through an internally screw-threaded axially disposed opening 30 with which the rear end wall 21 of the spindle member 20 is provided. Extending rearwardly from said feed screw journal portion 28 is a tail portion 31 upon which is suitably fixed the hub 32 of a crank or hand wheel 33. The end of said crank or hand wheel hub 32 lies contiguous to the outer face of the end plate or cap 19 of the spindle sleeve 14.

Pivotally connected by a hinge pin 34 to said end plate or cap 19 of the spindle sleeve 14 is a manipulatable locking key 35 which projects outwardly from said end plate or cap 19 through a radial slot 36 by which it is housed. The hub 32 of the crank or hand wheel 33 is provided with a lock socket 37 which is adapted to receive said locking key, in one operative position of the latter, whereby to lock the spindle sleeve 14 to the crank or hand wheel 33, subject to rotation by the latter when said crank or hand wheel is turned. Similarly, the end of the housing 10, which is adjacent to the end plate or cap 19 of the spindle sleeve 14, is also provided with a like lock socket 38, which is adapted to receive said locking key 35, in another operative position of the latter, whereby to lock said spindle sleeve 14 to the housing 10 against rotation, and thus to limit rotary motion to the feed screw 29 when the crank or hand wheel is turned.

Assuming it is desired to perform a screw-threading or tapping operation upon work supported in connection with the lathe headstock (not shown), a threading die, tap or other suitable threading tool (not shown) is affixed in the chuck 24 to project forwardly from the spindle structure of the tailstock. Prior to beginning the operation, the locking key 35 is swung rearwardly about its hinging pin 34, whereby to enter the same in the lock socket 37 of the crank or hand wheel hub 32 (see Fig. 1), thereby, through the thus disposed locking key, to interlock the end plate or cap 19 and spindle sleeve 14 with the crank or hand wheel 33, whereby to receive motion from the latter when it is turned, and so that said spindle sleeve 14 and spindle member 20 which is keyed thereto may be together rotated in the housing 10, and thus caused to impart rotary motion to the threading tool.

The spindle structure being thus conditioned subject to rotation and consequent rotation of the threading tool carried thereby, the housing 10 is slid forward on the cheeks or ways 11 of the lathe bed 12, so as to bring the tool into contact with the work, so that by pressing the housing forward and at the same time turning the crank or hand wheel to rotate the spindle structure and tool, said tool is caused to catch the work, and thereby start the screw-thread cutting action of the tool. Thereafter, the tailstock housing 10 being left free to move forward, the operator by turning the crank or hand wheel will cause the tool, as rotated, to advance along the work with the thread cutting effect, the tailstock housing being urged forward by such advance of the tool. During performance of the operation, since the tool itself is rotated, there is no necessity for rotating the lathe headstock mechanism, the latter and the work supported thereby remaining stationary. It will be obvious that, since the thread cutting operation is effected by rotating the cutting tool under manual control of the operator, the operator can sense that "feel" imparted by the tool progress by which he may gauge and judge that the cutting operation is being satisfactorily performed.

Assuming it is desired to perform a drilling or reaming operation upon work supported in connection with the lathe headstock, a drilling or reaming tool (not shown), as the case may be, is affixed in the chuck 24 for projection from the spindle structure. Prior to beginning such operation, the locking key 35 is swung forwardly about its hinging pin 34, whereby to disengage the crank or hand wheel hub 32 and thereupon to be entered in the lock socket 38 of the housing 10 (see Fig. 2), thereby to interlock the end plate or cap 19 and spindle 14 with the housing 10, so that the spindle structure is held against rotation, and so that turning of the crank or hand wheel 33 merely imparts rotary motion to the feed screw 29.

The spindle structure being held against rotation so that the tool carried thereby is also non-rotative, the housing 10 is slid forward so as to bring the tool in opposition to the work, whereupon power is applied to the headstock mechanism, so as to rotate the same and the work carried thereby. Thereafter, the operator by rotating the feed screw 29 in proper direction by means of the crank or hand wheel, may cause the spindle member 20, which is initially disposed in suitably retracted position, to move forward relative to the stationary spindle sleeve 14, thus advancing the tool against the rotated work, with operative effect, until the desired drilling or reaming operation, as the case may be, is finished. After the operation is finished, by reversing the rotation of the feed screw 29, the spindle member 20 and tool carried thereby may be easily retracted, whereby to withdraw the tool from the finished work.

The spindle structure in the form thereof shown in Fig. 1, when used for a screw-threading operation, requires that the tailstock housing be left free to advance as the tool progresses in the work. As an alternative to such arrangement, a modified form of the spindle structure is shown in Fig. 4 whereby the rotary movement of the spindle structure may be accompanied by an advancing longitudinal movement thereof, so that, during a screw-thread cutting operation, the tailstock housing 10 may be immovably locked to the cheeks or ways 11 of the lathe bed 12 by the usual or any conventional means (not shown). As thus modified, the spindle sleeve 14 is provided in a length in excess of the length of the housing 10, so that a rear end part 14' thereof may project freely from the housing when the operation is initiated. It will be obvious that this arrangement will permit the spindle structure, while being rotated with the threading tool in operative engagement with the work, to also advance axially through the stationary housing 10 conformably to the progress of the tool. A modified form of locking key 35' is also provided, whereby the same may be operatively engaged in a correspondingly modified lock socket 38', when the spindle sleeve is in normal initial retracted position, and thus to lock the spindle structure against rotation when so desired.

Figure 5:
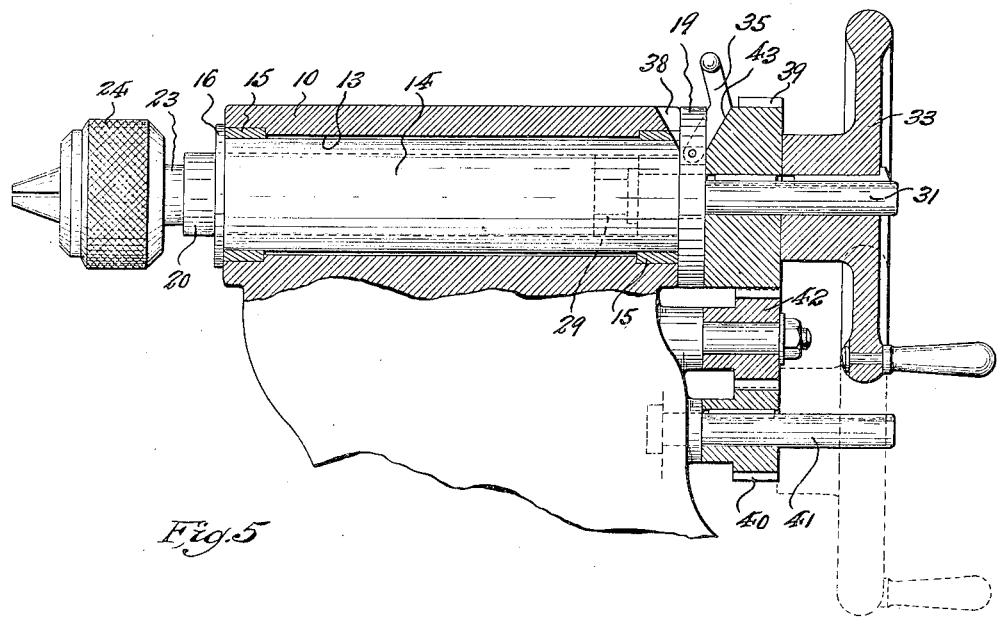
Fig. 5 is a longitudinal sectional view, with parts in elevation, of another modified form of the tailstock according to this invention.

In Fig. 5 is shown a further modified arrangement of the tailstock spindle structure and means for actuating the same which is especially adapted for use on large lathes or where comparatively heavy screw-threading or tapping operations are to be performed, which require application of greater power or effort or performance at desirably lower speed. The modification comprises the provision of reduction gearing between the crank or hand wheel and the spindle structure. In one illustrative form of such modified construction, as shown in Fig. 4, the reduction gearing is so arranged that its use is optional, i. e. the spindle structure may be subject to direct drive by the crank or hand wheel or indirect drive through the reduction gearing at the option of the operator. To this end, the driven gear 39 of the reduction gear train is keyed to the tail portion 31 of the feed screw 29, intermediate the end plate or cap 19 of the spindle sleeve 14 and the crank or hand wheel 33. The drive gear 40 of the reduction gear train is fixed on a parallel counter shaft 41 which is suitably journaled in the tailstock body or housing 10, and said drive gear 40 is arranged to drive said driven gear 39 through an idler gear 42 which is suitably mounted in connection with the tailstock body or housing 10. The hub of the driven gear 30, which lies contiguous to the end plate or cap 19 of the spindle sleeve 14, is provided with a lock notch 43 which is engageable by the locking key 35 when the spindle structure is desired to be rotated. In other respects the spindle structure and its mode of use is the same as already above described. When it is desired to subject the spindle structure to direct drive by the crank or hand wheel 33, the latter is fixed on the tail portion 31 of the feed screw 29 (as shown by full lines in Fig. 4). When, however, it is desired to drive the spindle structure through the reduction gearing, said crank or hand wheel 33 is removed from the tail portion 31 of the feed screw 29 and transferred to and fixed on the counter shaft 41 (as shown by broken lines in said Fig. 4). In the latter case it will be obvious that a plurality of turns of the crank or hand wheel, according to the ratio of the reduction gearing, will be required to effect each revolution of the spindle structure, thus obtaining increase of power application to the threading tool and lower speed of movement thereof. It will be understood that the form and arrangement of reduction gearing, as illustratively shown and as above described, is subject to considerable variation, and consequently other forms thereof may be employed within the intended scope of this invention.

Having now described our invention, we claim:

1. In a lathe tailstock having a housing portion provided with an endwise open longitudinal bore, a spindle structure comprising a spindle sleeve rotatably mounted in said bore, a tool supporting spindle member slidable in said spindle sleeve and adapted to project exteriorly from the forward end thereof, means for keying said spindle member and spindle sleeve together against relative rotation yet leaving the former free to move axially relative to the latter, a rotatable feed screw means journaled in the rear end portion of said spindle sleeve and adapted to operatively engage the inner end portion of said spindle member, and a manipulatable locking means carried by the rear end portion of said spindle sleeve, said feed screw means and tailstock housing portion each having means selectively engageable by said locking means, whereby engagement of said locking means with the feed screw means interlocks said spindle structure thereto subject to rotation thereby, and engagement of said locking means with the tailstock housing portion secures said spindle structure against rotation by said feed screw means.

2. In a lathe tailstock having a housing portion provided with an endwise open longitudinal bore, a spindle structure comprising a spindle sleeve rotatably mounted in said bore, a tool supporting spindle member slidable in said spindle sleeve and adapted to project exteriorly from the forward end thereof, means for keying said spindle member and spindle sleeve together against relative rotation, a cap affixed to the rear end of said sleeve, feed screw means journaled in said cap and adapted to operatively engage the inner end of said spindle member, a hand wheel affixed to the outer end of said feed screw means, and manipulatable locking means carried by said cap, said hand wheel and said tailstock housing portion each having means selectively engageable by said locking means, whereby engagement of said locking means with said hand wheel interlocks said spindle structure thereto subject to rotation thereby, and engagement of said locking means with said tailstock housing portion secures said spindle structure against rotation by said hand wheel.

3. In a lathe tailstock having a housing portion provided with an endwise open longitudinal bore, a spindle structure comprising a spindle sleeve rotatably mounted in said bore, a tool supporting spindle member slidable in said spindle sleeve and adapted to project exteriorly from the forward end thereof, means for keying said spindle member and spindle sleeve together against relative rotation, a cap affixed to the rear end of said sleeve, feed screw means journaled in said cap and adapted to operatively engage the inner end of said spindle member, a hand wheel affixed to the outer end of said feed screw means, and a locking key pivotally connected to said cap and extending radially therefrom, said hand wheel having a lock socket to receive said locking key, and said tailstock housing portion also having a lock socket to receive said locking key, said locking key being movable to selectively engage one or the other of said lock sockets for the purposes described.

4. In a lathe tailstock having a housing portion provided with an endwise open longitudinal bore, a spindle structure comprising a spindle sleeve rotatably mounted in said bore, said spindle sleeve having an external stop flange at its forward end to abut the forward end of said tailstock housing portion, a tool supporting spindle member slidable in said spindle sleeve and adapted to project exteriorly from the forward end thereof, means for keying said spindle member and spindle sleeve together against relative rotation, a cap affixed to the rear end of said sleeve, feed screw means journaled in said cap and adapted to operatively engage the inner end of said spindle member, a hand wheel affixed to the outer end of said feed screw means, said cap having an external annular portion disposed between the rear end of said tailstock housing portion and said hand wheel, the annular portion of said cap having a radial outwardly open slot, and a locking key pivotally connected with said cap to extend radially outward through said slot, said hand wheel having a lock socket to receive said locking key, and said tailstock housing portion also having a lock socket to receive said locking key, said locking key being movable to selectively engage one or the other of said lock sockets for the purposes described.

5. In a lathe tailstock having a housing portion provided with an endwise open longitudinal bore, a spindle structure comprising a spindle sleeve rotatably mounted in said bore, said spindle sleeve having an external stop flange at its forward end to abut the forward end of said tailstock housing portion, a tool supporting spindle member slidable in said spindle sleeve and adapted to project exteriorly from the forward end thereof, means for keying said spindle member and spindle sleeve together against relative rotation, a cap affixed to the rear end of said sleeve, feed screw means journaled in said cap and adapted to operatively engage the inner end of said spindle member, means to rotate said feed screw means including reduction gearing, and a manipulatable locking means carried by said cap, said feed screw rotating means and said tailstock housing portion each having means selectively engageable by said locking means, whereby engagement of said locking means with the feed screw rotating means interlocks said spindle structure thereto subject to rotation thereby, and engagement of said locking means with the tailstock housing portion secures said spindle structure against rotation by said feed screw rotating means.

ALEX GRUEN.
JOHN D. KIRWAN.

REFERENCES CITED

The following references are of record in the file of this patent:

UNITED STATES PATENTS

| Number | Name | Date |
|---|---|---|
| 938,995 | Evans | Nov. 2, 1909 |
| 1,404,103 | Eckenroth | Jan. 17, 1922 |